Figure 1:
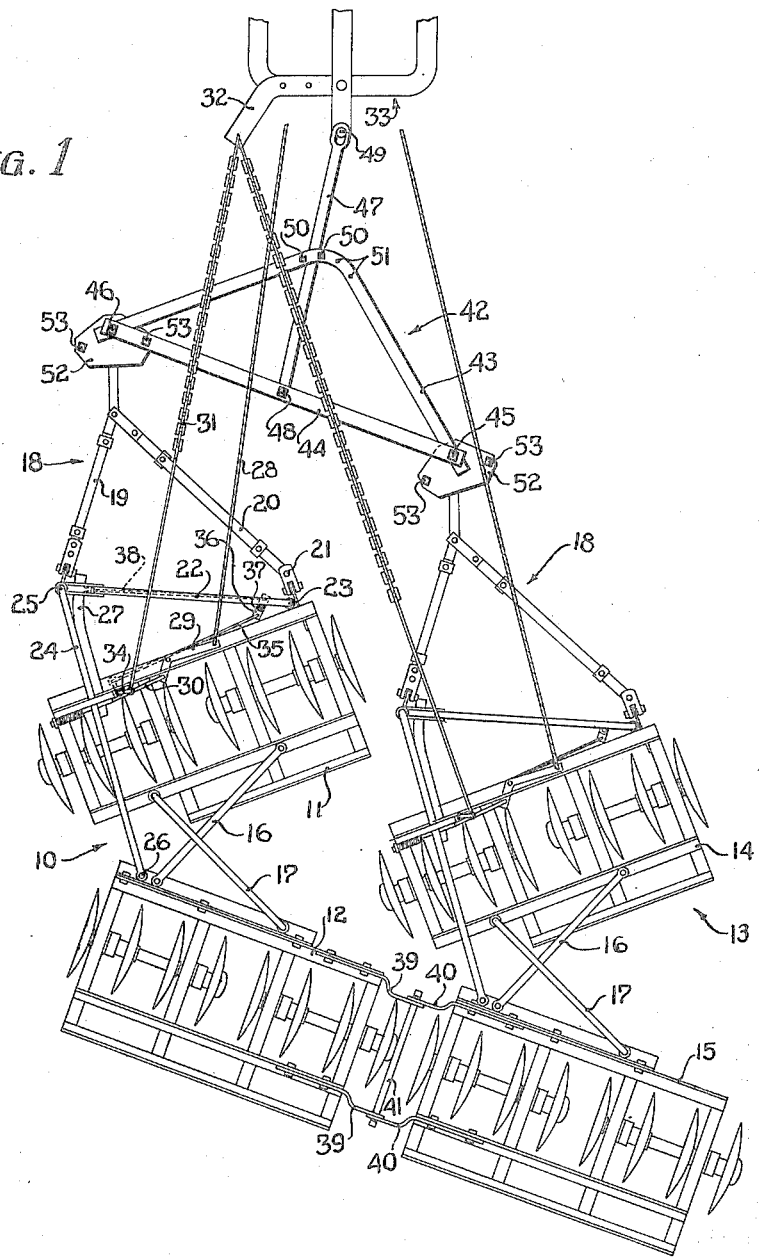

Jan. 28, 1941.　　A. C. LINDGREN ET AL　　2,230,041
HARROW CONSTRUCTION
Filed Feb. 23, 1940　　2 Sheets-Sheet 1

INVENTORS.
ALEXUS C. LINDGREN
LEE H KAUPKE
LEWIS E. SMITH
BY Paul O. Pippel
ATT'Y.

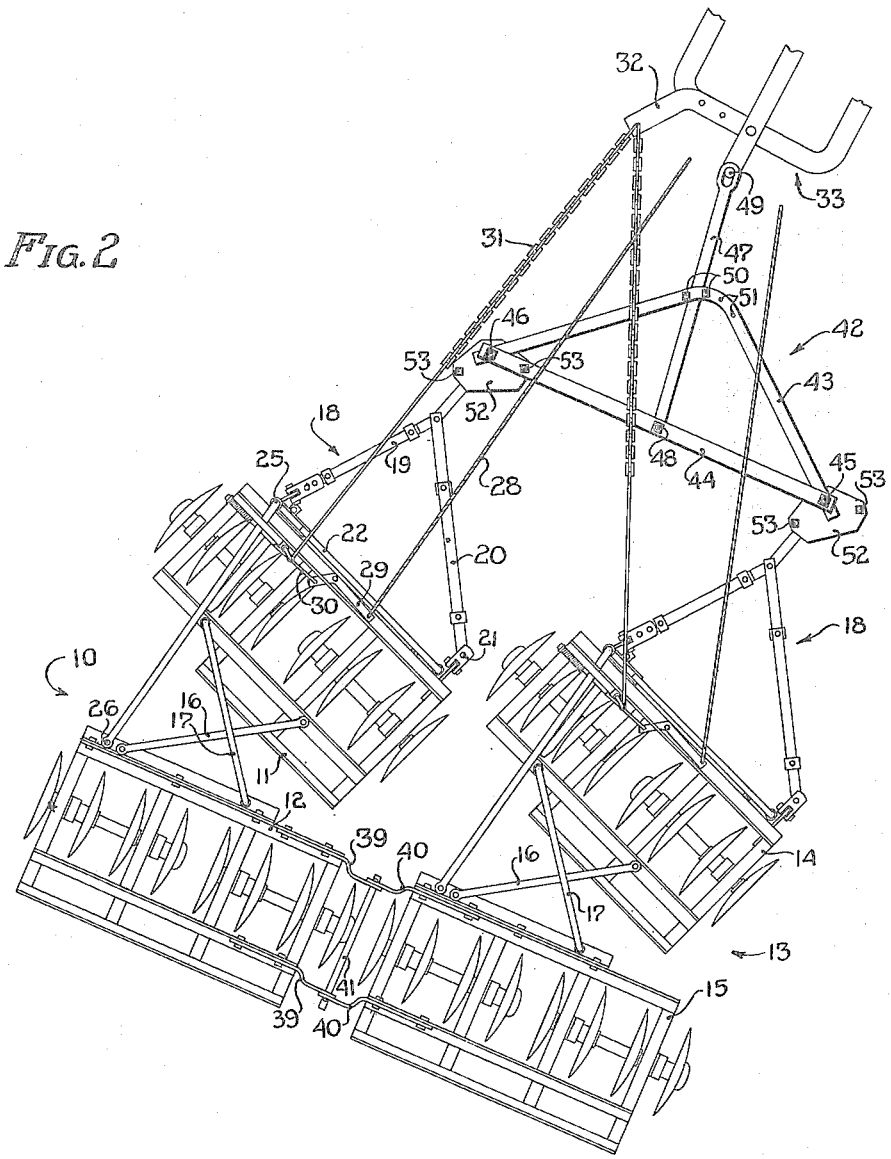

Patented Jan. 28, 1941

2,230,041

UNITED STATES PATENT OFFICE 2,230,041

HARROW CONSTRUCTION

Alexus C. Lindgren, Chicago, Ill., and Lee H. Kaupke and Lewis E. Smith, Auburn, N. Y., assignors to International Harvester Company, a corporation of New Jersey Application February 23, 1940, Serial No. 320,460

16 Claims. (Cl. 55—83)

This invention relates to a harrow construction. More specifically it relates to a harrow construction in which pairs of offset harrows are attached in squadron formation.

It is frequently the practice to employ two pairs of tandem connected harrows side by side where the width of one harrow pair is insufficient. When harrows are used side by side, there is a problem of connecting them properly, so that they do not leave a portion of the ground untilled.

An object of the present invention is the provision of an improved harrow construction.

A further object is to provide a squadron type of harrow composed of a pair of interconnected offset harrows.

Another object is the provision of a squadron type harrow which will not leave a ridge of untilled ground at the middle of the path over which the harrow travels.

A still further object is to provide an improved hitch frame for a squadron type harrow.

According to the present invention a pair of offset harrows are positioned side by side, and the rear frames are connected together so as to be held in line. Hitch members are connected to the front and rear frames of each harrow and to a framework which is in turn pivotally connected to a tractor.

In the drawings:

Figure 1 is a plan view of the harrow of the present invention in working position; and, Figure 2 is a plan view of the harrow in turning position.

The harrow of the present invention comprises an offset harrow 10 composed of a front frame 11 and a rear frame 12, and an offset harrow 13 composed of a front frame 14 and a rear frame 15. The front frame of each harrow is joined to the rear frame by means of cross links 16 and 17 which permit an angular movement of the frames in the horizontal plane. Each harrow has associated therewith a hitch frame 18 for pulling the harrow. Each hitch frame comprises essentially a triangular framework composed of a member 19, a member 20 pivotally connected at 21 to one end of the front frame, and a member 22 pivotally connected at 23 on the front frame adjacent the point 21. The members 19 and 20 are adjustable in length, so that the hitch frame 18 can be varied in length. A longitudinal reach member 24 is pivotally connected to a point 25 on the front frame and to a point 26 at one end of the rear frame. A curved member 27 is releasably connected at one end to the member 22 of the hitch frame and at the other end to the front of the front frame of the harrow. The offset harrows 10 and 13 are similar to the harrow shown in the patent to Johnson 2,164,211, June 27, 1939, and per se form no part of the present invention. As more fully disclosed in the Johnson patent, the curved member 27 is lockable to the front harrow frame and is releasable by a pull on a cord 28, which acts upon a lever 29 and a link 30 to release the connection of the member 27 with the front frame. The operating angle of the harrow, or rather the relative angle of the front and rear frames is determined by the position of the member 27 with respect to the front frame, as is more fully disclosed in the Johnson patent. When the harrow is to be released from angle for turning, the member 27 is released from the member 22 of the hitch frame by means of a pull upon a chain 31, connected to an offset member 32 secured to a draft member 33 of a tractor, not otherwise shown. The chain 31 is connected to a lever 34 connected in turn to a link 35, connected to a lever 36 pivoted at 37 on the member 22, and connected to a link 38 which effects release of member 27 from the member 22. This is more fully shown in the above mentioned Johnson patent. A more complete description of the turning of the harrow will be given later.

The rear frames 12 and 15 carry respectively extensions 39 and 40 which overlap. A pin 41 extends through the overlapping portions of the extensions, and thereby the rear frames are so pivotally connected that they are held against movement in a horizontal plane and are allowed relative angular movement in a vertical plane. The rear frames are connected in this way so that there will be no spaces between them which may cause a ridge to be left in the path over which the harrow moves.

The hitch frames 18 are connected to the drawbar 33 of the tractor by means of a framework 42. This framework comprises a bent member 43, a straight member 44 having its ends secured at 45 and 46 to the ends of the bent member, and a member 47 pivotally connected at 48 to a mid-point of the member 44 and directly pivotally connected at 49 to the draw-bar 33. The member 47 is adjustably fixed against movement with respect to the members 43 and 44 by means of bolts 50 positioned in any adjacent two of a group of holes 51 in the member 43. The hitch frames 18 are pivotally connected at 45 and 46 to opposite sides of the framework 42. The angle through which the hitch frames may move with respect to the framework 42 is limited by plates 52 secured to the framework 42 and laterally spaced bolts 53 extending downwardly from the plates 52, so as to be in the path of movement of the members 19.

Figure 1 shows the harrow in operative position and for making left turns, and Figure 2 shows the harrow in position for a turn to the right. As is obvious from Figure 1, the relative position of the front and rear frames is improper for a turn to the right. Consequently, the frames must be released from one another and adjusted so that their positions are as shown in Figure 2. This is accomplished as follows: When the tractor with its draw frame 33 and offset member 32 starts to turn to the right, a pull is exerted on the chains 31 so as to release the gangs from angle by release of the member 27 from the member 22 and so as to exert a pull on the left end of the front frames. The longitudinal reach members tend to hold the rear frames 12 and 15 in their same position, and the chains 31 pull the left end of the front frames 11 and 14 so that finally the frames are in the angle as shown by Figure 2 and the turn may be completed.

As previously mentioned, the rear frames are held in alinement by means of the extensions 39 and 40 and pin 41. This relationship is important because it prevents the formation of a ridge.

The framework 42 is also of importance because it permits an easy turning of the harrow either to the left or to the right. The bolts 53, projecting downwardly through the plates 52 fixed to the framework 42, limit the pivotal movement of the hitch frames 18 with respect to the framework 42 and, consequently, help to maintain a better control of the harrow.

It will be apparent from the foregoing description that a novel harrow construction has been provided. The intention is to limit the invention only within the scope of the appended claims.

What is claimed is:

1. In combination, pairs of disk gang frames, each pair being composed of front and rear frames disposed in tandem relation and pivotally connected to one another, the disks of the rear frames being held in line through a connection of the rear gangs, the front gangs being adapted to have a substantial angle with respect to the rear gangs in operating position and to be generally parallel to each other, and hitch means attached at the front of the pairs of frames and adapted to connect the frames to draft means.

2. In combination, pairs of disk gang frames, each pair being composed of front and rear frames disposed in tandem relation and pivotally connected to one another, the disks of the rear frames being held in line through a connection of the rear gangs, the front gangs being adapted to have a substantial angle with respect to the rear gangs in operating position and to be generally parallel to each other, and a draft means, hitch means connecting the draft means and the pairs of frames, and means connecting the draft means and the pairs of frames for causing the turning of the draft means to effect the necessary change in angle of the gangs for turning.

3. In combination, pairs of disk gang frames, each pair being composed of front and rear frames disposed in tandem relation and pivotally connected to one another, the disks of the rear frames being held in line through a connection of the rear gangs, the front gangs being adapted to have a substantial angle with respect to the rear gangs in operative position and to be generally parallel to each other, a draft means, hitch means connecting the draft means and the pairs of frames, and means connecting a point on the draft means laterally offset from the point of attachment of the hitch means and one frame for shifting of the frames with respect to one another to permit turning of the frames.

4. In combination, pairs of disk gang frames, each pair being composed of front and rear frames disposed in tandem relation and pivotally connected to one another, the disks of the rear frames being held in line through a connection of the rear gangs, the front gangs being adapted to have a substantial angle with respect to the rear gangs in operating position and to be generally parallel to each other, a draft means, hitch means connecting the draft means and the pairs of frames, and means connecting a point on the draft means laterally offset from the point of attachment of the hitch means and one front frame for shifting the front frames with respect to the rear frames to permit turning of the pairs of frames.

5. In combination, pairs of disk gang frames, each pair being composed of front and rear frames disposed in tandem relation and pivotally connected to one another, the disks of the rear frames being held in line through a connection of the rear gangs, the front gangs being adapted to have a substantial angle with respect to the rear gangs in operating position and to be generally parallel to each other, a draft means, hitch means connecting the draft means and the pairs of frames, and means to permit turning of the draft means and the pairs of frames in the direction in which the frames will not normally permit turning because of the angle between the front and rear frames, said means connecting the frames and a point on the draft means laterally offset from the point of attachment of the hitch means in the direction opposite that in which turning is to occur.

6. In combination, a first pair of front and rear disk gang frames disposed in tandem relation and pivotally connected to one another, a second pair of front and rear disk gang frames disposed in tandem relation and pivotally connected to one another, the rear gang frames being connected to one another so as to be held in line, means for locking each front gang frame to the rear gang frame of the same pair, draft means, hitch means connecting the draft means and each pair of gang frames, and means connecting a point of the draft means laterally offset from the point of connection of the hitch means and one gang frame of each pair for changing the angle of the gang upon turning of the draft means.

7. In combination, a first pair of front and rear disk gang frames disposed in tandem relation and pivotally connected to one another, a second pair of disk gang frames disposed in tandem relation and pivotally connected to one another, the rear gang frames being connected to one another so as to be held in line, means for locking each front gang frame to the rear gang frame of the same pair, draft means, hitch means connecting the draft means and each pair of gang frames, and means connecting a point of the draft means laterally offset from the point of connection of the hitch means and the front gang frame of each pair for changing the angle of the gangs upon turning of the draft means.

8. In combination, pairs of disk gang frames, each pair being composed of front and rear frames disposed in tandem relation and pivotally connected to one another, the rear frames being connected so as to be held in line, a draft means, a framework pivotally connected with the draft means, a first hitch means connected with one point of the framework and with one gang frame of one pair to one side of the pivotal connection of the frames of the pair and with the other gang frame to the other side of the pivotal connection, and a second hitch means connected with a second point of the framework laterally offset from the said one point of one gang frame of the other pair to one side of the pivotal connection of the frames of the pair and with the other gang to the other side of the pivotal connection.

9. The combination set forth in claim 8 and further including a means connected to a point of the draft means laterally offset from the connection of the draft means and the framework and to the front frame of each pair at a point on the opposite side of the pivotal connection between the frames of the pair from the connection of the front frame with the hitch means.

10. In combination, pairs of disk gang frames, each pair comprising front and rear frames disposed in tandem relation and pivotally connected to one another, the rear frames being connected so as to be held in line, a draft means, a framework pivotally connected to the draft means, a first hitch frame pivotally connected at one point to the framework and at a second point to one end of the front frame of one pair, a first member connecting a third point on the hitch frame and the opposite end of the rear frame of the same pair, a second hitch frame pivotally connected at one point to a point on the framework laterally offset from the point of connection of the first hitch frame with the framework and with one end of the front frame of the other pair, and a second member connecting a third point on the second hitch frame and the opposite end of the rear frame.

11. The combination set forth in claim 10 and further including a means connected to a point of the draft means laterally offset from the connection of the draft means and the framework and to the end of the front frame of each pair opposite the end connected to the hitch frame.

12. In combination, pairs of disk gang frames, each pair comprising front and rear frames disposed in tandem relation and pivotally connected to one another, the rear frames being connected so as to be held in line, draft means, a first hitch means pivotally connected to the draft means, a second hitch means pivotally connected to the first hitch means at a point spaced from the connection of the first hitch means with the draft means and having connection with one pair of frames, and a third hitch means pivotally connected with the first hitch means at a point spaced from the connections of the first hitch means with the draft means and with the second hitch means and having connection with the other pair of frames.

13. The combination specified in claim 12 and further including a means connecting the draft means and the pairs of gang frames for causing the relative angle of the frames to be changed upon turning of the draft means.

14. The combination specified in claim 12 and further including a means connecting a point of the draft means laterally offset from the connection of the draft means with the first hitch means and one gang frame for causing the relative angle of the frames to be changed upon turning of the draft means.

15. The combination specified in claim 12 and further including a means connecting a point of the draft means laterally offset from the connection of the draft means with the first hitch means and front frames of each pair for causing the relative angle of the frames to be changed upon turning of the draft means, and means for locking the front gang of each frame in a certain angle with respect to the rear frame.

16. In combination, a pair of harrows each comprising front and rear frames pivotally connected in tandem relation, the rear frames being connected so as to be held in longitudinal alinement, a draft means, a first hitch frame connected to the front and rear frames of one harrow, a second hitch frame connected to the front and rear frames of the other harrow, and a framework pivotally connected at a first point to the draft means, at a second point to the first hitch frame, and at a third point to the second hitch frame and having means adjacent the second and third points limiting the angular movement of the hitch frames with respect to the framework.

ALEXUS C. LINDGREN.
LEE H. KAUPKE.
LEWIS E. SMITH.